United States Patent [19]
Gabrisch et al.

[11] Patent Number: 5,972,810
[45] Date of Patent: Oct. 26, 1999

[54] SELF-ADHESIVE PREPREG, PROCESS FOR PRODUCING SAME, AND USE THEREOF

[75] Inventors: Hans-Joachim Gabrisch, Hurtgenwald, Germany; Marteen De Zwart, Bottenwil; Markus Rudin, Reigoldswil, both of Switzerland

[73] Assignee: Isola AG, Duren, Germany

[21] Appl. No.: 08/826,169

[22] Filed: Mar. 27, 1997

[30] Foreign Application Priority Data

Mar. 27, 1996 [DE] Germany .......................... 196 12 211

[51] Int. Cl.⁶ ...................................... B32B 5/16
[52] U.S. Cl. ............... 442/117; 442/60; 442/69; 442/149; 442/169; 442/175; 442/177; 442/179; 442/180; 442/218; 428/272; 428/240; 428/260; 428/324; 428/112; 525/211; 525/438; 525/482; 525/502
[58] Field of Search ..................................... 442/117, 149, 442/169, 175, 177, 179, 180, 218, 60, 69; 128/112, 272, 240, 260, 324; 525/211, 438, 482, 502

[56] References Cited

U.S. PATENT DOCUMENTS

| | | | |
|---|---|---|---|
| 4,329,387 | 5/1982 | Goodrich et al. | 428/196 |
| 4,704,322 | 11/1987 | Roberts | 428/251 |
| 4,746,560 | 5/1988 | Goeden | 428/151 |
| 5,536,562 | 7/1996 | Tran et al. | 428/218 |
| 5,616,405 | 4/1997 | Kishi et al. | 442/60 |

FOREIGN PATENT DOCUMENTS 30 08 490 A1  9/1981  Germany .......................... B29D 3/02

OTHER PUBLICATIONS

*Plastverarbeiter* (24) 1973/9, pp. 535–542.

Primary Examiner—Marion McCamish
Assistant Examiner—Arti R. Singh
Attorney, Agent, or Firm—Jacobson, Price, Holman & Stern, PLLC

[57] ABSTRACT

There are described a self-adhesive prepreg on the basis of a resin-impregnated fibrous supporting material carrying on at least one surface a layer with an increased ratio of resin to supporting material, and the use thereof for the production of sandwich structures.

22 Claims, No Drawings

SELF-ADHESIVE PREPREG, PROCESS FOR PRODUCING SAME, AND USE THEREOF

The present invention relates to a self-adhesive prepreg on the basis of a resin-impregnated fibrous supporting material, a process for producing same, and the use thereof for the production of sandwich structures.

Sandwich constructions on the basis of honeycomb core materials (Nomex®-Honeycomb) and/or foam core materials and fiber reinforced face layers find increasingly wider application today in the production of primary structures which are utilized, for example, in aviation, for instance, of fuselage, airframe, wings, tail assemblies, rotors, etc. The mechanical properties of such sandwich constructions are very much dependent on the bond of the face layers to the core material. In producing light and highly rigid primary structures of that kind, chiefly a carbon fiber reinforced material is used, because high strengths and rigidities, with concurrently a low weight, are achievable with this material.

Sufficiently high adherence of the face layers to the core material for such applications is given when, during the peeling test, the bond between the core material and the fiber reinforced face layer is so strong that the core material itself fails while the composite of core material and face layer is retained. For such purposes, today, self-adhesive prepregs, that is, resin matrix-preimpregnated fibrous structures, are employed, with resin contents of about 50% by weight based on the weight of the prepreg. With an identical resin content in percent by weight, there results in the case of a supporting material based on glass fibers a higher resin content in terms of volume than in the case of a supporting material based on carbon fibers, since the carbon fibers have a distinctly higher volume while their mass is identical. This affects the self-adhesive properties of structures on the basis of carbon fibers.

Today, usually toughened epoxy resins are applied as matrix materials enabling the above-mentioned self-adhesive properties. However, the resin systems which come into consideration for use in primary structures for aviation, that is, the systems that cure at 180° C., and which even at elevated temperatures, upon moisture saturation, still exhibit the required mechanical properties, no longer are to be classified as self-adhesive, because of the required high crosslinking density and the thereby involved high brittleness. Consequently, to ensure sufficient adhesion of the face layers, such prepregs according to the prior art must be processed into sandwich constructions by means of so called adhesive films, that are placed directly on the core material. However, these adhesive films suffer from the drawback that they exhibit very poor mechanical properties upon moisture saturation and at elevated temperatures ("hot/wet" properties), and, in addition to this, add to the weight of the sandwich construction but do not themselves appreciably contribute to a gain in rigidity. Moreover, such adhesive films are expensive.

It is therefore the object of the present invention to provide a self-adhesive prepreg which exhibits excellent mechanical properties upon moisture saturation even at an elevated temperature (135° C.) and exhibits self-adhesive properties when synthetic fibers, glass fibers, carbon fibers, aramide fibers and/or mixtures or hybrids thereof are used, even at low resin contents, without the use of an adhesive film.

This object is accomplished by the self-adhesive prepreg according to claim 1. The subclaims relate to preferred embodiments of this prepreg as well as the use thereof for the production of sandwich structures with honeycomb and/or foam core materials.

The subject-matter of the invention therefore is a self-adhesive prepreg on the basis of a resin-impregnated fibrous supporting material for the production of sandwich structures, which is characterized by carrying on at least one surface a layer with an increased ratio of resin to supporting material.

The prepreg according to the invention carries on a core region at least one surface region with a higher ratio of resin to supporting material, said ratio being based on the weight. Thus the core region in the middle of the prepreg has a smaller weight ratio of resin to fibrous supporting material than at least one of the surface regions disposed thereon in the region of the outer sides of the prepreg. Of course, when embedded as a medial layer between two honeycomb core material structures, the prepreg according to the invention may carry such a more resinous layer on both surfaces.

The prepreg according to the invention therefore comprises a resin-impregnated fibrous supporting material which carries on at least one surface a layer of a resin-impregnated lightweight auxiliary fibrous material for the formation of a highly resinous layer, which is capable of taking in a resin content higher than that which can be taken in by the fibrous supporting material applied for the core layer(s).

Consequently, the lightweight auxiliary fibrous material has a lower density, i.e. at the same thickness a lower weight per unit area than the fibrous supporting material of the core layer of the prepreg, for example, a weight per unit area of 15 to 200 $g/m^2$, preferably of 20 to 50 $g/m^2$. In contrast to this, the fibrous supporting material has a weight per unit area of 20 to 1,200 $g/m^2$, preferably of 50 to 600 $g/m^2$, and more preferably of 60 to 300 $g/m^2$. In particular, carbon fiber fabrics with weights per unit area of 80 to 700 $g/m^2$, preferably of 90 to 285 $g/m^2$, glass fiber fabrics with weights per unit area of 20 to 1,200 $g/m^2$, preferably of 50 to 600 $g/m^2$, or aramide fiber fabrics with weights per unit area of 35 to 770 $g/m^2$, preferably of 60 to 230 $g/m^2$, are used.

According to a preferred embodiment of the invention the lightweight auxiliary fibrous material consists of bonded short fibers, preferably a nonwoven material, and/or of loosely bonded continuous fibers, preferably a tulle or another textile knitted fabric or interwoven fabric consisting of synthetic fibers, glass fibers, carbon fibers, aramide fibers and/or mixtures or hybrids thereof, which is applied on the surface of the actual fibrous supporting material, the latter being in the form of a fabric, a multiaxial fabric, a unidirectional tape of a strand of filaments and/or a knitted fabric.

Customary fibrous materials which possess the required strength, and heat resistance properties, for example, polyester, glass, carbon, aramide and/or mixtures or hybrids thereof, may be used as materials for both the fibrous supporting material and the lightweight auxiliary fibrous material. The fibers may be utilized separately, or also in the form of mixtures, with any desired type of surface bonding.

For example glass fabric has at a thickness of 195 $\mu$m a weight per unit area of 212 $g/m^2$, carbon fiber fabric has at a thickness of 245 $\mu$m a weight per unit area of 205 $g/m^2$, non-woven glass fabric has at a thickness of 685 $\mu$m a weight per unit area of 122 $g/m^2$, and glass tulle has at a thickness of 565 $\mu$m a weight per unit area of 249 $g/m^2$. Consequently, the lightweight auxiliary fibrous material has a lower density, i.e. at the same thickness a lower weight per unit area than the fibrous supporting material of the core layer of the prepreg, for example, a density in the range of 0.1 to 0.55, preferably of 0.15 to 0.50 $g/cm^3$, while the fibrous supporting material of the core layer of the prepreg of the present invention has a density in the range of 0.6 to 1.4, preferably of 0.75 to 1.2 $g/cm^3$.

It is, however, only essential that the prepreg according to the invention have in the surface to be joined with the core material of the sandwich structure a higher resin content than in the other regions of the prepreg. According to a preferred embodiment of the invention the resin content of the prepreg therefore rises from the middle of the material towards at least one surface, wherein this rise may be continuous or discontinuous (by degrees).

The impregnated fibrous supporting material preferably has a resin content of 10 to 50% by weight, more preferably of 20 to 50% by weight, and, accordingly, a fiber content of 90 to 50% by weight, preferably of 80 to 50% by weight, while the impregnated auxiliary fibrous material has a resin content of 50 to 90% by weight, preferably of 50 to 80% by weight, and, accordingly, a fiber content of 10 to 50% by weight, preferably of 20 to 50% by weight.

The distribution of the resin content preferably is such that about 30% by weight are in the fibrous supporting material and, correspondingly, about 70% by weight are in the auxiliary fibrous material. Thus, while according to the subject teaching there is a lower weight ratio of resin to fibers within the core of the prepreg than on the surfaces, in conventional prepregs of this kind the resin is contained homogeneously distributed.

The prepreg according to the invention is produced in such a way that a lightweight auxiliary fibrous material, for example, in the form of a nonwoven fabric and/or tulle is applied on the surface of the fibrous supporting material, and the fibrous structure so obtained is impregnated with the matrix resin and dried. Preferably, the impregnating resin is precured as far as the B-stage, and then can be finally, and fully, cured during the production of the actual sandwich construction under the action of heat and pressure.

In the prepreg according to the invention the fibrous materials of the supporting material and of the lightweight auxiliary fibrous material are impregnated with one or more highly crosslinking thermosetting materials, that is, thermosetting resins, which may contain customary components, such as curing agents, cure activators, flame retardants, agents modifying the mechanical properties, etc. besides the actual thermosetting resin.

Owing to the structure according to the invention with the resinous surface layer the prepreg according to the invention provides the requisite self-adhesive and bonding properties even with overall resin contents below 50% by weight, for instance, of 40 to 50% by weight, or also less, so that high-quality sandwich constructions can be produced successfully without the use of adhesive films, even when carbon fibers are used in the fibrous material of the prepreg, and, optionally, also of the core material.

Preferably, the supporting materials of the prepreg according to the invention are impregnated with one or more highly crosslinking thermosetting materials which, upon curing, exhibit a glass transition temperature (Tg) of more than 180° C., preferably of more than 200° C., and a glass transition temperature, upon moisture saturation, of more than 135° C.

According to a preferred embodiment of the subject teaching the prepreg according to the invention has a content of 20 to 60% by weight, preferably of 40 to 50% by weight, more preferably of 35 to 45% by weight, of highly crosslinking thermosets.

The prepreg according to the invention advantageously comprises as a thermoset a phenolic resin, an epoxy resin, a bismaleinimide resin, a triazine resin and/or a cyanate ester resin. According to a preferred embodiment of the invention, the highly crosslinking thermoset contains a toughened resin, for instance, a rubber-modified epoxy, so as to in this way achieve further enhanced bonding properties.

The amount of epoxy which can be added to the basic thermoset primarily depends on the initial glass transition temperature of the basic resin. The higher this temperature the higher an amount of epoxy may usually be added. However, according to the invention sufficient self-adhesive properties are achieved through the resinous surface layer.

While there result clear differences in mechanical properties and in the properties after moisture saturation when laminates are composed of alternating systems suitable for hot/wet conditions, with layers of adhesive films, the laminates composed of the prepreg according to the invention and layers of pure carbon fiber fabrics exhibit unchanged good mechanical properties.

During the peeling test, the sandwich constructions produced from the prepreg according to the invention and honeycomb core materials—which constructions are designed such that the resinous surface layer of the prepreg according to the invention faces the honeycomb core material—show the desirable behavior, namely that the honeycomb core material itself fails while the composite of face layer and core material is retained.

The prepreg according to the invention thus enables excellent hot/wet and self-adhesive properties in producing sandwich constructions, and, on the other hand, good bonding properties, thus enabling the production of high-quality sandwich constructions for aviation.

The invention also relates to a process for producing the above-described prepreg, the process comprising the steps of applying on one or both surfaces of a fibrous supporting material a layer of auxiliary fibrous material with a lower weight per unit area, impregnating the fibrous material construction with a thermosetting resin, and converting the resin to the B-stage, for instance, by drying at an elevated temperature, thereby removing the solvent employed.

The invention in addition relates to the use of the above-described prepreg for the production of sandwich constructions with honeycomb and/or foam core materials.

The example given below serves to illustrate the invention further.

EXAMPLE

A carbon fiber fabric having a weight per unit area of 225 g/m$^2$ and carrying on one surface a layer of nonwoven material composed of glass fibers with a weight per unit area of 34 g/m$^2$ is used as a fibrous supporting material.

This fibrous material is impregnated with the mixture of components given below:

| | Component | Amount based on fraction of solids (% by weight) |
|---|---|---|
| 1 | Highly crosslinking thermosetting reaction resin | 51.0 |
| 2 | Low-molecular-weight epoxy resin | 11.0 |
| 3 | Toughened epoxy resin | 31.0 |
| 4 | Highly-viscosity phenoxy resin | 4.3 |
| 5 | Dicyandiamide | 2.5 |
| 6 | Accelerator | 0.2 |

Impregnation is carried out applying a quantity of 210 g/m$^2$ in the classic manner with the help of a vertical coating device, with the solvent (methyl ethyl ketone) being removed and the matrix being converted to the B-stage. As a result, a weight per unit area of the prepreg of 470 g/m$^2$ is obtained, which corresponds to an overall resin content of 45% by weight. Using the prepreg obtained in this manner, and a honeycomb core material (Nomex®) with a cell size of 3.2 mm, a weight of unit volume of 48 kg/m³, and a thickness of 9 mm, a sandwich construction is produced. Two face layers of the prepreg are applied in each case, the first layer being placed 0°/90°, and the second layer being placed +45°. Pressing is done for two hours at 3.5 bar and 180° C.

Properties of the Sandwich Construction

Desired value for fracture of the honeycomb during peeling test: >35 Nmm/mm.

Actual value during peeling test: 37 Nmm/mm, with fracture of the honeycomb.

With a sandwich construction produced, for purposes of comparison, without the auxiliary fibrous material, applying the same resin formulation and the same resin content, only an actual value of 25 Nmm/mm is achieved during the peeling test, wherein the face layers detach from the honeycomb core without fracture of the honeycomb core.

As regards the other mechanical properties like flexural strength, interlaminar peel strength, compressive strength, and tensile strength (measured on full laminates), the composites produced with the prepreg according to the invention are equivalent to those produced in the conventional manner.

We claim:

1. A sandwich structure comprising a honeycomb and/or foam core material and face layers, wherein the core material is bonded to the face layers by means of a self-adhesive prepreg of resin-impregnated fibrous supporting material, characterized in that the prepreg comprises a core layer of a fibrous supporting material and at least one surface layer of a lightweight auxiliary fibrous material, wherein the fibrous supporting material has a higher weight per unit area than the auxiliary fibrous material, wherein the weight ratio of resin to supporting material in the surface layer is higher than in the core layer, and wherein the fibrous supporting material and auxiliary fibrous material are impregnated with a thermosetting resin converted to the B-stage.

2. The sandwich structure according to claim 1, characterized in that the fibrous supporting material and/or the auxiliary fibrous material are comprised of synthetic fibers, glass fibers, carbon fibers, aramide fibers, and/or mixtures of hybrids thereof.

3. The sandwich structure according to claim 1, characterized in that the fibrous supporting material has a weight per unit area of 20 to 1,200 g/m².

4. The sandwich structure according to claim 1, characterized in that the fibrous supporting material has a weight per unit area of 50 to 600 g/m².

5. The sandwich structure according to claim 1, characterized in that the fibrous supporting material has a weight per unit area of 60 to 300 g/m².

6. The sandwich structure according to claim 1, characterized in that the fibrous supporting material is in the form of a fabric, a multiaxial fabric, a unidirectional tape, and/or a knitted fabric.

7. The sandwich structure according to claim 1, characterized in that the lightweight auxiliary fibrous material has a weight per unit area of 15 to 200 g/m².

8. The sandwich structure according to claim 1, characterized in that the lightweight auxiliary fibrous material has a weight per unit area of 20 to 50 g/m².

9. The sandwich structure according to claim 1, characterized in that the lightweight auxiliary fibrous material consists of bonded short fibers, and/or of loosely bonded continuous fibers, said fibers being synthetic fibers, glass fibers, carbon fibers, aramide fibers, and/or mixtures or hybrids thereof.

10. The sandwich structure according to claim 9, characterized in that the lightweight auxiliary fibrous material is a non-woven fabric of boded short fibers.

11. The sandwich structure according to claim 9, characterized in that the lightweight auxiliary fibrous material is a textile knitted fabric of loosely bonded continuous fibers.

12. The sandwich structure according to claim 11, characterized in that the lightweight auxiliary fibrous material is a tile.

13. The sandwich structure according to claim 1, characterized in that the fibrous supporting material has a resin content of 10 to 50% by weight and the auxiliary fibrous material has a resin content of 50 to 90% by weight.

14. The sandwich structure according to claim 1, characterized in that the fibrous supporting material has a resin content of 20 to 50% by weight, and the auxiliary fibrous material has a resin content of 50 to 80% by weight.

15. The sandwich structure according to claim 1, characterized in that the resin comprises one or more highly crosslinking thermosets that exhibit a glass transition temperature (Tg) of more than 180° C. upon curing and a glass transition temperature of more than 135° C. upon moisture saturation.

16. The sandwich structure according to claim 1, characterized in that the resin comprises one or more highly crosslinking thermosets that exhibit a glass transition temperature (Tg) of more than 200° C. upon curing and a glass transition temperature of more than 135° C. upon moisture saturation.

17. The sandwich structure according to claim 15, characterized by containing 20 to 60% by weight of the highly crosslinking thermosets.

18. The sandwich structure according to claim 15, characterized by containing 40 to 50% by weight of the highly crosslinking thermosets.

19. The sandwich structure according to claim 15, characterized in that the highly crosslinking thermoset is a phenolic resin, an epoxy resin, a bismaleinimide resin, a traizine resin, and/or a cyanate ester resin.

20. The sandwich structure according to claim 15, characterized in that the highly crosslinking thermosets includes a toughened resin.

21. The sandwich structure according to claim 20, characterized in that the toughened resin is a rubber-modified epoxy resin.

22. A process for the production of the sandwich structure of claim 1 comprising the steps of:

applying onto one surface, or both surfaces, of a fibrous supporting material a layer of auxiliary fibrous material having a lower weight per unit area, than the fibrous supporting material, effecting a fibrous material construction;

impregnating the fibrous material construction with a thermosetting resin; and converting the resin to the B-stage.

* * * * *